United States Patent
Meyer et al.

(10) Patent No.: US 7,876,781 B2
(45) Date of Patent: Jan. 25, 2011

(54) METHOD AND SYSTEM FOR PROCESSING A DATA UNIT

(75) Inventors: Michael Meyer, Aachen (DE); Reiner Ludwig, Hurtgenwald (DE); Joachim Sachs, Aachen (DE); Mats Sagfors, Kyrkslatt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1341 days.

(21) Appl. No.: 10/480,953

(22) PCT Filed: May 22, 2002

(86) PCT No.: PCT/EP02/05624

§ 371 (c)(1),
(2), (4) Date: Aug. 14, 2004

(87) PCT Pub. No.: WO02/100064

PCT Pub. Date: Dec. 12, 2002

(65) Prior Publication Data

US 2004/0258091 A1 Dec. 23, 2004

(30) Foreign Application Priority Data

May 23, 2001 (EP) .................................. 01112026

(51) Int. Cl.
*H04J 3/16* (2006.01)
(52) U.S. Cl. ................................................ 370/469
(58) Field of Classification Search ............. 370/469, 370/474
See application file for complete search history.

(56) References Cited

U.S. PATENT DOCUMENTS

| 5,701,300 | A | | 12/1997 | Jeon et al. |
| 6,064,678 | A | * | 5/2000 | Sindhushayana et al. .... 370/470 |
| 6,081,505 | A | * | 6/2000 | Kilkki .......................... 370/230 |
| 6,760,860 | B1 | * | 7/2004 | Fong et al. ....................... 714/4 |
| 6,771,673 | B1 | * | 8/2004 | Baum et al. .................. 370/535 |

(Continued)

FOREIGN PATENT DOCUMENTS

EP 0905950 3/1999

(Continued)

OTHER PUBLICATIONS

Kim Y et al; "Performance Analysis of Data Packet Discarding in ATM Networks" IAEEE/ACM Transactions on Networking, IEEE Inc. New York US vol. 7 No. 2 Apr. 2, 1999 pp. 216-227 XP000828688.

(Continued)

*Primary Examiner*—Kwang B Yao
*Assistant Examiner*—Tung Q Tran

(57) ABSTRACT

A method of processing a data unit of a first protocol layer for transmission in a data unit based communication system is described, comprising the steps of passing to a second protocol layer a given data unit of said first protocol layer that is to be transmitted, determining a numeric value of a numerically quantifiable parameter associated with said given data unit of said first protocol layer, embedding said given data unit of said first protocol layer into one or more data units of said second protocol layer, performing transmission control for said one or more data units of said second protocol layer in accordance with said numeric value of said numerically quantifiable parameter.

36 Claims, 11 Drawing Sheets

U.S. PATENT DOCUMENTS

| | | | |
|---|---|---|---|
| 7,200,111 B2 * | 4/2007 | Garcia-Luna-Aceves et al. | 370/230 |
| 2003/0076848 A1 * | 4/2003 | Bremler-Barr et al. | 370/412 |
| 2004/0199630 A1 * | 10/2004 | Sarkissian et al. | 709/224 |
| 2005/0254458 A1 * | 11/2005 | Proctor et al. | 370/328 |
| 2007/0025380 A1 * | 2/2007 | Amagai et al. | 370/428 |

FOREIGN PATENT DOCUMENTS

| | | |
|---|---|---|
| EP | 0959589 | 11/1999 |
| EP | 1249972 | 10/2002 |
| WO | WO 9927464 | 6/1999 |

OTHER PUBLICATIONS

3G TS RAN 25.323 Vo.1.0 (SEp. 1999); 3$^{rd}$ Generation Partnership Project (3GPP); Tenical Specification Group (TSG) RSN; Working Group 2 (WG2); PDCP Protocol Specification (3G TS 25.323 version 0.1.0).

3GPP TS 25.323 V3.4.0 (Mar. 2001); 3$^{rd}$ Generation Partnership Project; Techinical Specification Group Radio Access Network; Packet Data Convergence Protocol (PDCP) Specification (Release 1999).

3GPP TS 25.301 V3.7.0 (Mar. 2001); 3$^{rd}$ Generation Partnership Project; Techinical Specification Group Radio Access Network; Radio Interface Protocol Architecture (Release 1999).

3GPP TS 25.322 V3.6.0 (Mar. 2001); 3$^{rd}$ Generation Partnership Project; Techinal Specification Group Radio Access Network; RCL protocol specification (Release 1999).

* cited by examiner

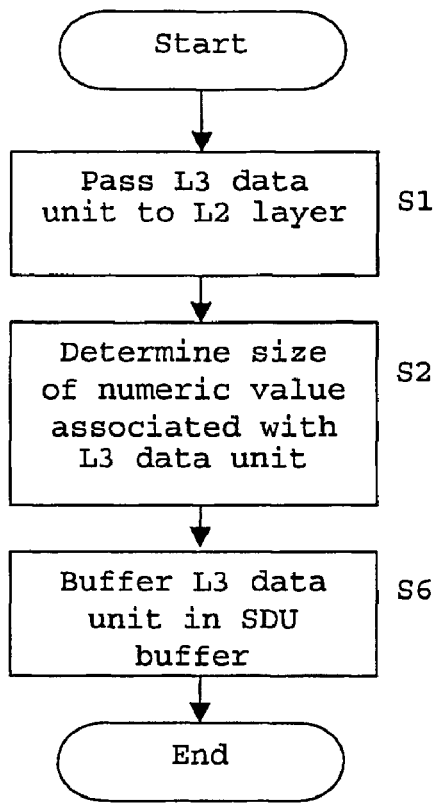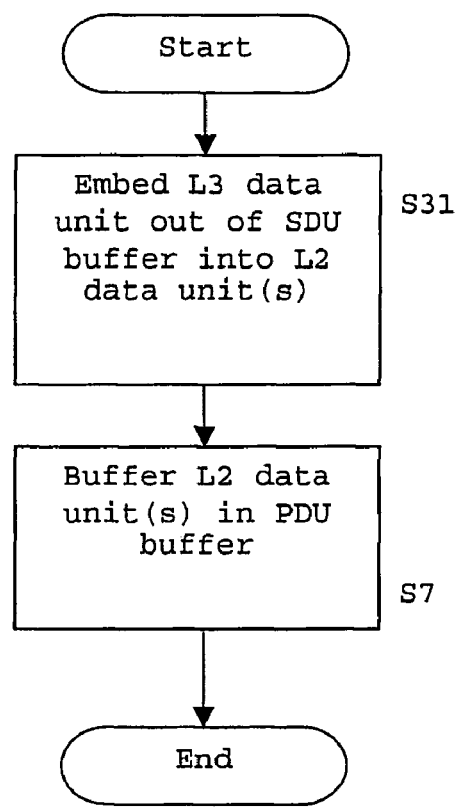
Fig. 7a
Fig. 7b

METHOD AND SYSTEM FOR PROCESSING A DATA UNIT

FIELD OF THE INVENTION

The present invention relates to a method of processing a data unit in a data unit based communication system, and to a corresponding data unit based communication system.

BACKGROUND OF THE INVENTION

A well known principle for data exchange in networks is that of data unit exchange. This means that data to be sent is broken down into individual units. Rules for sending and receiving such units, as well as rules for the structure of the units themselves, are determined by so-called protocols. Protocols are sets of rules that allow the communication between a sending end and a receiving end, as the rules specify how and in what form data to be sent has to be prepared such that the receiving end may interpret the data and react in accordance to protocol defined rules to which both partners in the communication adhere. The two ends of a communication adhering to a specific protocol are also referred to as peers.

Such data units are sometimes referred to by different names, depending on the type of protocol involved, such as packets, frames, segments, datagrams, etc. For the purpose of clarity the present description uses the term "data unit" generically for any type of data unit associated with any type of protocol.

An important concept in communications using data unit exchange is that of protocol layering. This means that a number of protocols (sometimes also referred to as a suite) is organized in a hierarchy of layers, where each layer has specific functions and responsibilities. The concept of layering is well known in the art and described in many textbooks, for example "TCP-IP illustrated, volume 1, The Protocols" by W. Richard Stevens, Addison Wesley, 1994, such that a detailed description is not necessary here.

The TCP/IP protocol suite is an example of a layered protocol hierarchy. A basic structure of a protocol hierarchy is defined by the OSI (Open System Interconnection) layer model. At a lowest layer, which is also referred to as the physical layer or L1, the functions of directly transporting data over a physical connection are handled. Above the physical layer, a second layer L2, which is also referred as to the link layer is provided. The link layer L2 fulfils the function of handling the transport of data units over links between communication nodes. Above the link layer L2 a third layer L3 is provided, which is also referred to as the network layer. The network layer handles the routing of data units in a given network. An example of a network layer protocol is the internet protocol (IP). Above the network layer, a fourth layer L4 is provided, which is also referred to as the transport layer. Examples of a transport layer protocol are the transmission control protocol (TCP) or the user datagram protocol (UDP).

In a data unit based communication system using a hierarchy of protocol layers, a communication comprises passing a given data unit downwards through the protocol hierarchy on the sending side, and passing a data unit upwards through the protocol hierarchy on the receiving side. When a data unit is passed downwards, each protocol will typically, perform a certain function with respect thereto, e.g. add further information and change or adapt the structure to specific rules of that protocol layer. Typically each protocol layer will add its own header to a data unit received from a higher protocol layer and may also add delimiters. When a specific protocol layer receives a data unit from a higher protocol layer, it will embed the higher layer data unit into a data unit adhering to the rules of the given protocol layer. The term "embedding" shall refer to both encapsulation in which one data unit of a higher layer is placed into one data unit of a given layer, and to segmentation, where one data unit of a higher layer is segmented into a plurality of data units of the given protocol layer.

An important aspect of the layering scheme is that the different layers are "transparent". This means that the peers in a layer are oblivious to what happens in another layer.

Typically, each protocol layer will perform some type of transmission control for its data units. Such transmission control can e.g. comprise the performing of a certain type of forward error correction, the setting of parameters associated with an automatic repeat request (ARQ) function, the scheduling of data units, or the performing of comparable operations.

It is known to implement protocol layers in such a way that they can be operated in a specific mode with respect to the transmission control. As an example, a so-called numbered mode (or I-mode) and a so-called unnumbered mode (UI-mode) are known. In the numbered mode, if it is determined that a sent data unit was not correctly received by the receiving peer, then the sending peer performs retransmission of said data unit. In this way it can be assured that all packets are correctly transmitted, although this may increase the delay, depending on how many packets have to be transmitted. On the other hand, in the unnumbered mode, no retransmissions are provided. This has the advantage of less delay, but the transmission reliability depends on the quality of the physical connection.

The possibility of setting a given protocol layer implementation into a specific transmission control mode has the advantage that the selection of the mode can e.g. be performed by a control procedure from a higher protocol layer, in order to optimize the sending of data units from said higher protocol layer. However, it does not provide very much flexibility, as a given protocol layer will typically handle a variety of different types of data units, that require different control settings with respect to the optimization of the sending of the given type of data unit. As an example, if an application layer is sending a computer file, it desires to ensure a reliable transmission, and may therefore want to set a lower layer protocol implementation into the numbered mode, or the application layer may want to send data that requires real-time transmission, such as a video stream belonging to a video telephone, in which case transmission speed is more important than reliability, such that the application layer may want to set a lower layer protocol implementation into the unnumbered mode. However, if both computer file data and video data are being sent, then the setting of the lower layer protocol implementation into a given transmission control mode will not provide an optimum solution.

EP-0 973 302 A1 addresses this problem and proposes a system, in which a given protocol layer that receives higher data unit layers and embeds these higher data layers into data units of said given layer, is arranged to discriminate the higher layer data unit layers by reading the header information and determining the type of the higher layer data unit. Then, a classification is performed in accordance with the identified type. In this, way, the given protocol layer can flexibly set the transmission reliability of its data units depending on the type of the higher layer data unit that is embedded in its own data units. As an example, if the system of EP-0 973 02 A1 is applied to a link layer in the TCP/IP suite, then the link layer can identify if the network layer IP data unit that it receives carries a TCP data unit, in which case the link layer data units are sent in the numbered mode, or if the network layer IP data unit carries UDP data unit, in which case the link layer data units are sent in the unnumbered mode.

However, the system of EP-0 973 302 A1 is not always practical, as it requires the parsing of higher layer data units in order to identify type information, which e.g. does not work when the higher layer data unit has an encrypted header and/or payload.

EP-0 959 589 A2 describes a system and method for link layer and MAC layer transaction completion procedures. It discusses the problem of having to maintain a protocol state over long periods of inactivity when using the radio link protocol (RLP) or the mobile data link protocol (MDLP). It is indicated as desirable to find a procedure for efficiently ending transactions. The idea of indicating the end of a temporary block flow in each radio link control (RLC) block, as suggested by GPRS is viewed as wasteful. In order to solve this problem, the document suggests a procedure, where the begin of a transaction is marked by a BEGIN PDU, where said PDU may contain a transaction size indicator that identifies the number of data blocks in the transaction.

WO 99/27464 and the paper "Performance Analysis of Data Packet Discarding in ATM Networks" by Kim et al. indicate that the sending of TCP packets over ATM networks leads to specific problems if individual ATM cells are dropped at congested ATM switches, because the loss of a single cell carrying a part of a packet will corrupt the entire packet. The concepts of PPD (partial packet discard) and EPD (early packet discard) as mechanisms that avoid these problems are described. In PPD, whenever a cell has been discarded by a switch due to congestion, the subsequent cells belonging to the same packet (except the last cell) are intentionally discarded. The intention is to conserve bandwidths and buffer space. EPD is designed to prevent unnecessary buffering of cells. This is done by setting a buffer threshold and testing the threshold to determine whether or not there is room in the buffer for the entire packet before buffering any cells. If the threshold is exceeded, all of the cells in the packet are dropped (except the last cell).

It is desirable to provide an improved method and system of processing data units of a higher protocol layer at a given protocol layer, which is simple to implement, but flexibly provides improved transmission properties.

SUMMARY OF THE INVENTION

In accordance with an embodiment of the present invention, at a given protocol layer, e.g. a link layer L2, one or more numeric values of one or more numerically quantifiable parameters associated with a received given data unit of a higher protocol layer, e.g. the network layer L3, are determined. In other words, one value of one numerically quantifiable parameter can be determined, or several values of one numerically quantifiable parameter, or one or more respective values for each of a plurality of numerically quantifiable parameters. The at least one numeric value is not derived from information contained in the given data unit of the higher protocol layer. In other words, instead of analyzing the content of the higher layer data unit, one or more simple physical properties that are numerically evaluatable are measured, and the embedding and/or transmission control is performed in accordance with the determined value. Consequently, no parsing of higher layer data units or other similar complicated processing is necessary.

As an example, a numerically quantifiable parameter can be the size of the higher layer data unit. In other words, at a given protocol layer e.g. L2, a higher layer data unit, e.g. from the L3 layer, is received, and the size of said L3 data unit is measured. Then the embedding operation for embedding said L3 data unit into one or more L2 data units, or the transmission control operation for transmitting the one or more L2 data units into which said L3 data unit has been embedded, is performed in accordance with the result of said size measurement.

Preferably, the size measurement is used as a basis for adjusting the transmission control to optimize predetermined target properties. More specifically the L2 data units are transmitted with parameters set for optimizing throughput if the L3 data unit falls into a predetermined size range, and otherwise the L2 data units are transmitted with optimized delay. Namely, if the L3 data unit is found to have a size indicative of a maximum size e.g. falls into a range around or is equal to the TCP maximum segment size if the L3 data units carry TCP data units, then the transmission of the L2 data units, into which said L3 data unit has been embedded, is optimized for throughput, as it may be assumed that the maximum size L3 data unit belongs to a larger amount of data being sent from above the L3 layer. On the other hand, if the L3 data unit is smaller in size, then the transmission control is optimized for delay, as it can be assumed that the smaller L3 data units are associated with control operations, such as synchronization or acknowledgment messages, where delay optimization is more suitable than throughput optimization.

Other examples of a numerically quantifiable parameter that can be used in the context of the present invention are a buffer fill level of a buffer holding data units of the upper protocol layer (e.g. L3), or of a buffer holding data units of the protocol layer (e.g. L2) receiving the upper layer data units. Another numerically quantifiable parameter is the inter-arrival time of the upper layer data units i.e. the time that passes between the arrival of two consecutive upper layer data units.

Each of the given examples of numerically quantifiable parameters can be used alone as a basis for providing one or more values to be used in performing the embedding and/or transmission control, or can be used together with one or more of the named numerically quantifiable parameters for providing such values to be used in performing the embedding and/or transmission control.

According to a preferred embodiment, the method of the present application also comprises a step of discriminating a group of data units of the higher protocol layer to which the higher layer data unit belongs. This discrimination can occur on the basis of source information and/or destination information in the higher layer data unit and/or a protocol identifier in the higher layer data unit. Especially, if the present preferred embodiment is applied in the context of TCP/IP, the discrimination can consist in determining the flow to which the higher layer data unit belongs. A flow is defined by the source and destination IP address, the source and destination port number and a protocol identifier.

The result of said discrimination can be used in the transmission control procedure for the data units into which the higher data unit layer is embedded. More specifically, referring to the above described example in which the size of the higher layer data unit was compared with a reference range or a reference value indicative of a maximum data unit size, it is possible to enhance such a comparison by taking into consideration the type of the higher layer data unit. Namely, the type of the higher layer data unit (or the type of a data unit contained in the higher layer data unit) can be used as a means for determining a reference range or reference value with which to compare the size of the higher layer data unit. As an example, if the higher layer data unit is identified as being of the first type (i.e. belonging to a first predetermined group), then the size of said higher data unit is compared to a first size reference value (or to a first set of size reference values, i.e. a discrete range of values, or to a first continuous range of values), whereas if the higher layer data unit is discriminated as being of a second type (i.e. belonging to a second predetermined group), then the size of said higher layer data unit is compared to a second size reference value (or to a second set of size reference values, or to a second continuous range of values).

On the other hand, the result of said discriminating step can also be used as a basis for determining the numerically quantifiable parameter of which a numeric value is determined. Namely, the numerically quantifiable parameter can be associated with a buffer fill level of a buffer holding data units of the lower protocol layer, where the numeric value is the number of data units of, the lower protocol layer (e.g. L2) in the buffer that embed data units of the higher protocol layers belonging to the discriminated group, e.g. belonging the discriminated flow. Equally, when using the inter-arrival time of the higher layer data unit as the numerically quantifiable parameter, then the numeric value can be chosen as the inter-arrival time value for those higher layer data units belonging to the discriminated group. In the latter case, i.e. when determining the inter-arrival time of data units belonging to a group, it is possible to add a further condition, e.g. to determine the inter-arrival time of such data units of the group that fall into a given size category. For example, if the group is a flow and the size category is selected to relate to data units that contain an acknowledgement (i.e. have a minimum size), then it is possible to use the inter-arrival time of the acknowledgment data units in the flow as a basis for the transmission control.

The transmission control performed in accordance with the numeric value of the numerically quantifiable parameter can consist in any suitable measures such as the adjusting of forward error correction, the adjusting of ARQ settings, or the adjusting of scheduling. Furthermore, if the embedding operation comprise a segmentation of the higher layer data unit into several lower layer data units, then this segmentation operation can be performed in accordance with the numeric value, namely by adjusting the size of the lower layer segments in accordance with the determined value. The transmission control can consist in making adjustments for the data units at the layer receiving the higher layer data units, or at a layer below. For example, if the method of the invention is applied to a link layer L2, then adjustments can be made for the L2 data units, but also for L1 data units.

As already mentioned, the transmission control can be performed to optimize certain target parameters, depending on the determined numeric value. Examples of such target parameters are the throughput (the amount of payload data transported per unit of time) or the (average) transmission delay.

According to another preferred embodiment, the transmission control for transmitting the lower layer data units, into which a higher layer data unit has been embedded, comprises a discrimination of the lower layer data units, such that each of the one or more lower layer data units is classified into one of a plurality of predetermined transmission categories on the basis of the discrimination result. This discrimination of lower layer data units can advantageously be combined with the discrimination of higher layer data units in such a way that the lower layer data units embedding a higher layer data unit belonging to a predetermined group are themselves divided into sub-groups associated with the group of the higher layer data unit. For example, if the group to which the higher data unit (e.g. L3 data unit) belongs is a flow, then such a flow can be divided into sub-flows at the lower protocol layer (e.g. L2) that embeds the data units of the flow.

According to another embodiment of the invention, one or more numeric values of a numerically quantifiable parameter are used in a congestion alleviation procedure, such that a decision step for deciding whether to perform a congestion alleviation measure with respect to a data unit or not depends on said numeric value or values. The congestion alleviation procedure can e.g. comprise a data unit dropping procedure and/or a data unit marking procedure. Therefore, the congestion alleviation measure can consist in dropping a data unit from the buffer, or in adding a marking to a data unit, said marking informing the communication end-points that congestion is taking place. An example of such a marking is the Explicit Congestion Notification (ECN) known from TCP/IP.

For example, L3 data units received at layer 2 are buffered before processing. Furthermore, a congestion alleviation procedure for performing a congestion alleviation measure with respect to one or more buffered L3 data units is provided. The congestion alleviation procedure can be triggered by a number of predetermined conditions, e.g. when a link-overload of the link over which the L2 data units are to be sent is detected, or a buffer overflow of the buffer storing the received L3 data units is detected. According to the embodiment, a decision step for deciding whether to perform a congestion alleviation measure or not depends on the described numeric value, e.g. on the size of the L3 data unit, or on the inter-arrival time of L3 data units. Although the above example related to the buffering of L3 data units received at L2 (sometimes also referred to as service data units SDUs), the concept of making a congestion alleviation decision dependent on a numeric value associated with a given L3 data unit is also applicable to one or more L2 data units (L2 PDUs) in which the given L3 data unit is embedded. However, especially if the congestion alleviation procedure consists in a data unit dropping procedure, it is preferable to perform any congestion alleviation at the highest sub-layer, i.e. at the SDU level, in order to avoid unnecessary embedding operations for data that is possibly dropped.

The method and system of the present invention can be put to practice in any suitable or appropriate way by hardware, by software or by any suitable combination of hardware and software.

BRIEF DESCRIPTION OF FIGURES

The present invention shall now be described by referring to detailed embodiments, which are only intended to be illustrative, but not limiting, with reference to the appended drawings, in which:

FIGS. 7a-7c show routines of an embodiment of the invention in which data units are buffered and a data unit dropping procedure is provided;

DETAILED DESCRIPTION OF EMBODIMENTS

In the following, detailed embodiments of the present invention shall be described in order to give the skilled person a full and complete understanding. However, these embodiments are illustrative and not intended to be limiting, as the scope of the invention is defined by the appended claims.

The following examples shall be described in the context of TCP/IP. However, it may be noted that the present invention is applicable to any protocol hierarchy in which higher layer data units are embedded into lower layer data units, and where a transmission control is performed for the lower layer data units.

The following embodiments shall be described in the context of applying the invention to a link layer L2, said link layer embedding L3 data units from the network layer. However, this is only an example, and the present invention can be applied at any level of a protocol hierarchy i.e. also below or above the link layer.

Figure 1:
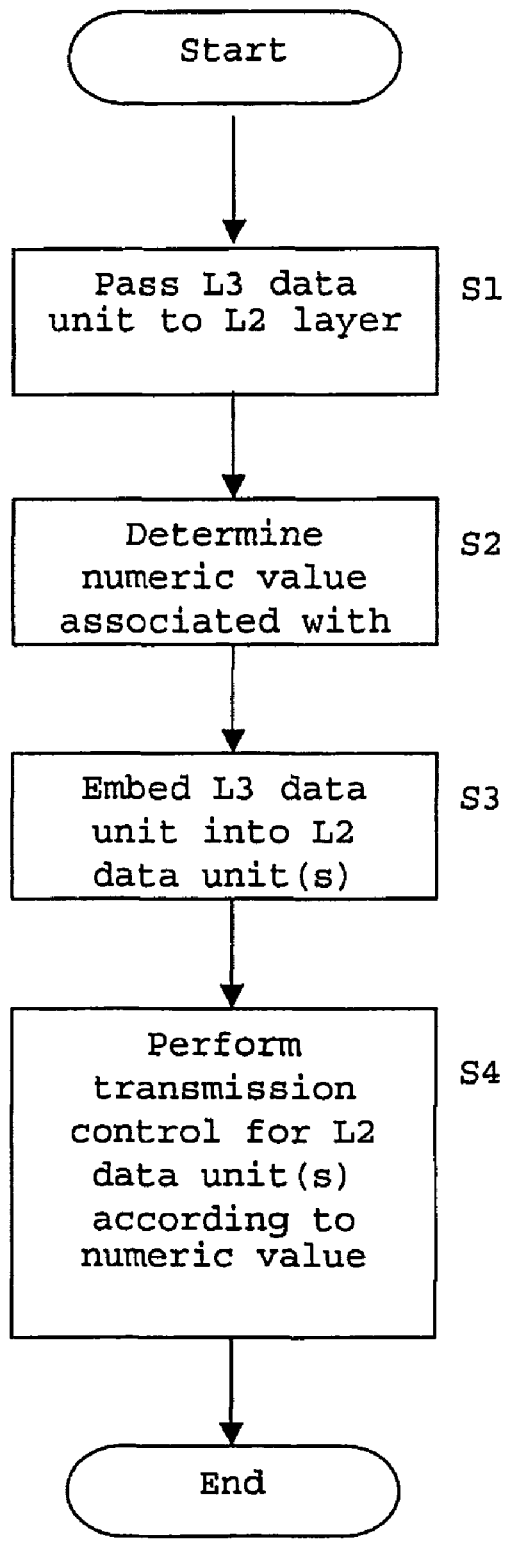
FIG. 1 shows a flow chart for explaining an embodiment of the present invention.

FIG. 1 shows a flow chart describing a first embodiment of the present invention. As can be seen, in a first step S1 a L3 data unit is passed to the link layer L2 below the layer L3. Then, in step S2, a numeric value of a numerically, quantifiable parameter associated with the L3 data unit is determined. It may be noted that the term "associated with the L3 data unit" is to be understood broadly as relating to any numerically quantifiable parameter derivable from the L3 data unit, where said parameter can relate to the L3 data unit as such, or to a data unit from a higher layer than L3 embedded in the L3 data unit. Then, in step S3, the received L3 data unit is embedded into one or more L2 data units. Finally, in step S4, transmission control for the one or more L2 data units and/or L1 data units that embed the received L3 data unit is performed according to the numeric value determined in step S2.

Although the example of FIG. 1 shows steps S1 to S4 in a specific sequence, this is only an example and other arrangements of steps S1 to S4 are possible.

The adjustments performed in step S4 will depend on the specific circumstances and the system under consideration. For example, the transmission control may comprise adjusting a forward error correction for the data units of the L2 protocol layer or for the L1 data units below the L2 protocol layer. The type of forward error correction can be chosen as is desirable or appropriate. For example, the transmission control may comprise adjusting a transmission power and/or a data rate (e.g. by selecting a spreading factor in a CDMA system) over a given link and/or a degree of interleaving. The mentioned link can e.g. be a wireless link.

If the L2 protocol layer comprises a function of providing automatic retransmission of L2 data units under predetermined conditions, then the transmission control may. comprise adjusting said retransmission function.

If the L2 protocol layer comprises a function for the scheduling of the L2 data units, then the transmission,. control may comprise adjusting said scheduling.

In the event that the embedding in step S3 is a segmentation operation, then the embodiment of FIG. 1 can be arranged such that the segmentation operation is performed according to said numeric value. In other words, the segmentation operation in dependence on the numeric value can be an alternative to making the transmission control in step S4 dependent on the numeric value, or the segmentation operation in dependence on the numeric value can be a supplement to making the transmission control in step S4 dependent on the numeric value, i.e. can be provided together with such transmission control.

The adjusting of said segmentation operation may e.g. comprise adjusting the size of the L2 data units into which a given L3 data unit is segmented.

Figure 2:
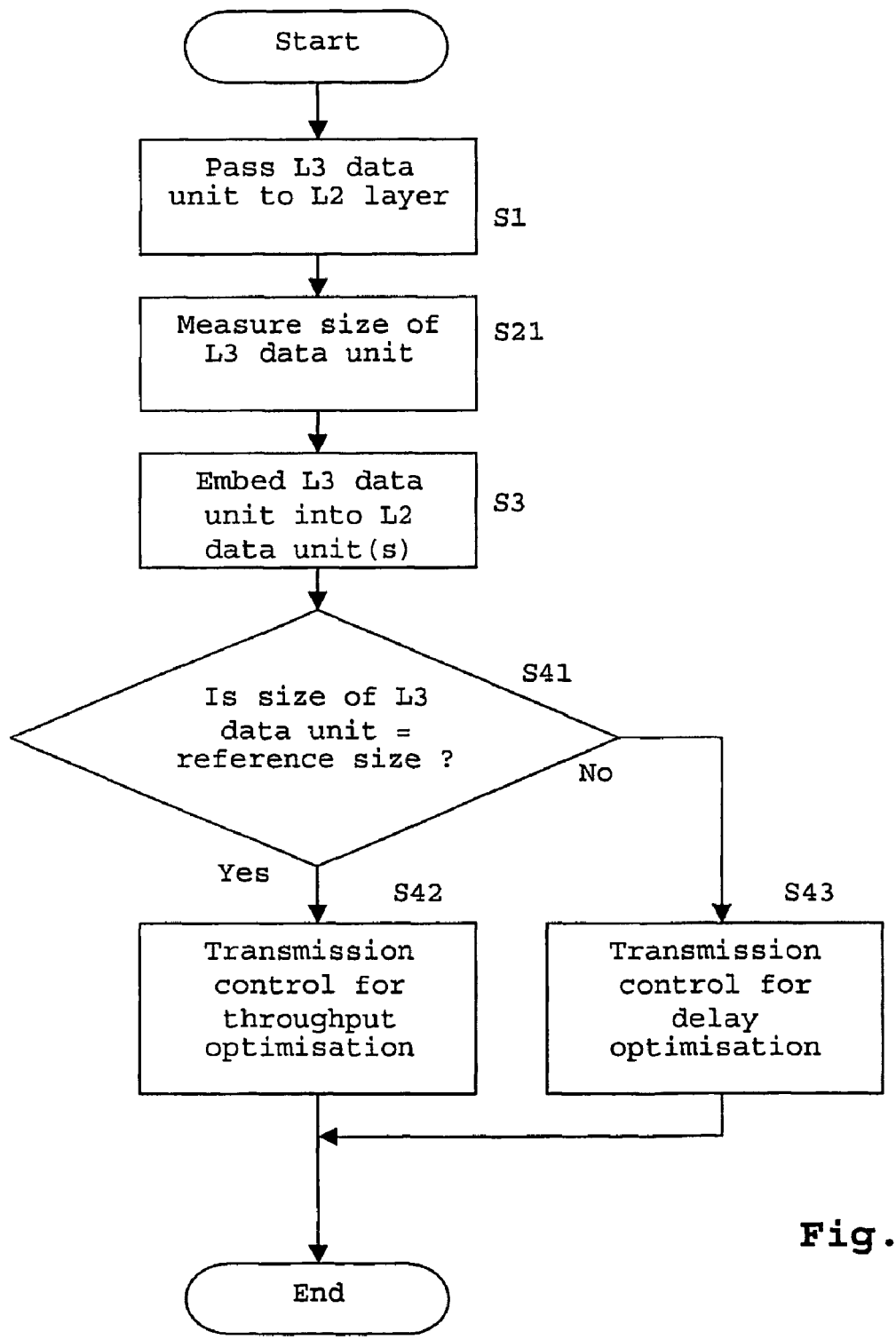
FIG. 2 shows a flow chart for explaining another embodiment of the present invention, in which the numeric value is determined based on data unit size.

FIG. 2 shows a flowchart of another embodiment of the present invention. The same reference signs as in FIG. 1 refer to the same steps in FIG. 2. Namely, first an L3 data unit is passed to the L2 layer in step S1. Then, in step S21, which represents an example of the more general step S2 shown in FIG. 1, the size of the received L3 data unit is measured. In other words, it is determined how much data is contained in the received L3 data unit, in any suitable dimension, such as bits or bytes.

The L2 data unit is embedded into one or more L2 units in step S3. Then, the transmission control is performed in accordance with steps S41, S42 and S43, which represent a specific example of the general procedure represented as S4 in FIG. 1. More specifically, step S41 compares the measured size of the L3 data unit with at least one reference size, where said reference size preferably represents a maximum data unit size. Then, if the size of the L3 data unit is equal to the reference size, the transmission control is optimized for throughput (steps S42), and if the size of the L3 data unit is different from the reference size, then transmission control is optimized with respect to delay (step S43).

In the above example, step S41 consists in comparing the measured size with a reference value. Naturally, the measured size can also be compared to a range of values, where said range can consist of a discrete number of reference values, or can be continuous, or can be a combination of discrete and continuous values. Also, in the above example, the reference value (or range) is indicative of a maximum data unit size. However, this is only an example, and the reference value (or range) can be chosen in any suitable or desirable way, depending on the given system and circumstances. For example, the reference value can also be indicative of a minimum data unit size that identifies a data unit carrying an acknowledgment.

The optimizing of transmission control for throughput can e.g. consist in reducing the amount of forward error correction and enabling ARQ for ensuring transmission reliability. On the other hand, optimizing transmission control for reducing delay can consist in increasing forward error correction, but disabling ARQ. This shall be explained in more detail in the following in the specific context of TCP/IP.

Non-real-time applications often run on top of TCP, whereas real-time applications usually run on top of UDP. The main design requirement for link layer (L2) protocols for non-real time applications is throughput optimization. This is for example achieved by tuning the trade-off between forward error correction and ARQ, so that the overall throughput is optimized. It is possible to obtain higher throughputs by weakening forward error correction and enabling ARQ. Throughput is the quantity of transmitted payload per unit of time. The throughput increases with decreasing forward error correction, as forward error correction increases overhead, which leads to a reduced amount of payload being transmitted.

In an encryption based forward error correction data is divided into blocks, where each block is the result of an encryption operation that combines the payload with redundancy information that allows a decision on the part of the receiver whether a block has been correctly received and decrypted. Then a block error rate may be defined as the rate of events in which a received block is judged as having an error. It may be noted that reduced forward error correction leads to an increased block error rate, but it can be shown that throughput can nonetheless be increased. For example, when calculating throughput as the product of data rate multiplied by (1—block error rate), a data rate of 8 kbit/s and block error rate of 0.01 leads to a throughput of 7.92 kbit/s, whereas a data rate of 12 kbit/s (achieved by less forward error correction) and a block error rate of 0.1 (due to the reduced forward error correction) lead to a throughput of 10.8 kbit/s. Consequently, although the block error rate is ten times higher, the increased payload data rate leads to an overall increased throughput.

The problem is that even in a flow corresponding to a TCP based bulk data transfer, which should overall be optimized for throughput, there are individual data units or segments, which are delay sensitive. Examples are the connection set-up messages, which should be exchanged as quickly as possible to be able to start with data transmission. Another example is the TCP acknowledgement messages in reverse direction, or HTTP requests, which should be received as soon as possible.

In order to differentiate between L3 data units that should be optimized for throughput and such that should be optimized for delay reduction, the present embodiment determines the size of the L3 data unit, see step S21 in FIG. 2.

Namely, L3 data units for which the throughput should be optimized in general belong to a larger application data amount, which is segmented into transport layer data units, e.g., TCP segments. Therefore, these transport layer data units, which are then embedded in network layer (L3) data units generally have a maximum transfer unit size, e.g. the TCP maximum segments size (MSS).

Consequently, as already mentioned, step S41 of FIG. 2 can be implemented in such a way that the comparison is conducted with respect to a reference value or reference range indicative of a predetermined maximum transfer unit size. Typically, the value of the maximum transfer unit size is 256 byte, 512 byte, 536 byte or 1460 byte, such that taking into account the IP header of 40 byte, suitable reference size values used in step S41 could be 296 byte, 552 byte, 576 byte or 1500 byte.

As already mentioned, step S41 can be implemented in such a way that the measured size of the L3 data unit is compared with a plurality of reference sizes, e.g. the previously mentioned series of discrete values 296, 552, 576 and 1500 bytes, or with a suitable continuous range, or with a combination of discrete values and continuous values. Then, if the measured size of the L3 unit is equal to any one of the plurality of reference sizes, or falls into the predetermined range or ranges, then step S42 is enabled, to thereby optimize the transmission control for throughput.

In this connection, it can be mentioned that the reference size values may not only take into account the IP header, but also the possibility of header compression. In other words, the plurality of size reference values used in step S41 also contains a set of values that take into account header compression.

In the example of FIG. 2, other data units having different sizes than the reference size are sent with optimized delay (step S43). In other words, they are sent with minimum delay. In the example of TCP/IP this means that all pure TCP control messages (such as synchronization messages, acknowledgement messages, . . . ) are sent with minimum delay. Also, the final data unit belonging to a larger application data amount is also transmitted with optimized (e.g. minimum) delay.

As already indicated above, delay optimization can for example be achieved by choosing the appropriate coding scheme and/or adjusting the transmission power. If one assumes an additional delay for a retransmission to be 100 ms, one can conclude that the transmission delay becomes less and less important for small data units. Therefore, it is better to use stronger forward error correction (e.g. more redundancy) and/or higher transmission power to improve the mean delay.

For example, if one considers a data unit of 100 byte size, and using the previously mentioned example values of a data rate of 8 kbit/s, block error rate of 0.01 and a block size of 20 byte, then a mean delay of 100+5 ms results, or assuming a data rate of 12 kbit/s, a block error rate of 0.1 and a block size of 30 byte, then a mean delay of 80+40 ms results. In the first example, one needs five blocks to transmit 100 byte, in the second only 4, due to the increased data rate and therefore block size. In the first case, the probability that the one of the five blocks is corrupted is approximately 5%, leading on average to an additional delay of 5 ms. The same calculation provides an additional delay of 40 ms for the second case. Consequently, the increased forward error correction, although the data rate is reduced, leads to an improved mean delay.

Another example is when the transmission control comprises regulation via the transmission power. This can be achieved e.g. by setting a target signal-to-interference ratio for the desired link, which is maintained by a power control loop. A higher signal-to-interference ratio results in an improved link quality, i.e. the number of transmission errors on the link is reduced, at the price of increased transmission power. Less transmission errors reduce the delay of error recovery and therefore the mean transmission delay is reduced.

In the example of FIG. 2, the outcome of decision step S41 is to either optimize the transmission for throughput or for delay. Naturally, this is only an example. The transmission control can also be optimized with regard to other target parameters, as is suitable or desired for a specific application or system. Such target parameters include system resources like e.g. transmission power, spreading codes, number of assigned physical channels. Furthermore, the outcome of decision step S41 can also lead to more than the two procedures S42, S43. For example, it is possible that step S41 is implemented in such a way that the L3 data unit size is compared to n reference sizes or n reference ranges, and the outcome leads to a corresponding number of n transmission control procedures, each transmission control procedure corresponding to one size reference value or range, and additionally one further default transmission control procedure for all those L3 data units that do not have the size of one of the n size reference values or does not fall into one of the n ranges.

Figure 3:
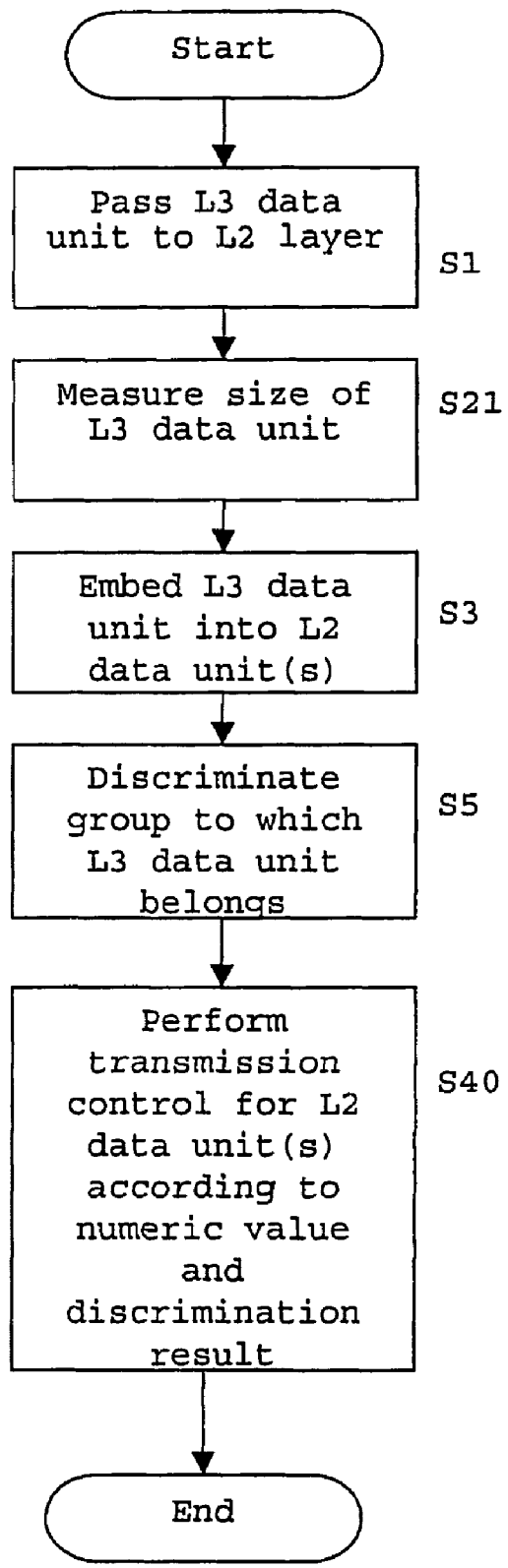
FIG. 3 shows a flow chart for explaining another embodiment of the present invention, in which higher layer data units are additionally discriminated.

In the embodiments described above, the transmission control performed in step S4 or steps S41 to S43 was performed on the basis of the numeric value determined in step S2. It should be noted that the transmission control can also be based on further measurements or determinations conducted with respect to a received L3 data unit. Namely, as shown in FIG. 3, in which steps S1, S21 and S3 are identical to the corresponding steps in FIG. 2, such that a further description is not necessary, a step S5 is performed after step S3, said step S5 discriminating a group to which the L3 data unit belongs. Then, in step S40, which is an example of general step S4 of FIG. 1, the transmission control for the one or more L2 data units that embed the received L3 data unit, is performed on the basis of the numeric value determined in step S21 and the discrimination result of the discrimination step S5.

Preferably, the discrimination is performed on the basis of destination information contained in the L3 data unit and/or a protocol identifier contained in the L3 data unit. For example, the group into which the L3 data unit is classified can be the flow to which it belongs. As already mentioned previously, in the context of TCP/IP, the group into which the L3 data unit is classified can be the flow to which it belongs, and the flow is defined by a source and destination IP address, a source and destination port number, and a protocol identifier. As another example, the group to which an L3 data unit belongs can also be determined by the type of payload being transmitted, which type can e.g. be determined by checking a protocol identifier in the data unit. This means checking the protocol identifier of the L3 data unit itself, or checking one or more protocol identifiers of data units being transported as payload in the L3 data unit.

The performing of the transmission control in step S40 can be conducted in any suitable or desirable way, depending on the specific circumstances of the application. For example, procedure S40 of FIG. 3 can be arranged in a similar way as steps S41, S42 and S43 of FIG. 2, with the addition that the size reference used in the comparison is also selected in dependence on the group into which the L3 data unit is classified. For example, the group can be determined on the basis of the type of data unit embedded in the L3 data unit, e.g. the discrimination consists in determining if the IP data unit carries a TCP data unit or a UDP data unit. If it is determined that it carries a TCP data unit, then a first set of size reference values can be used, and if it is determined that the IP data unit carries a UDP data unit, then a second set of size reference values can be used in the comparison.

Figure 4:
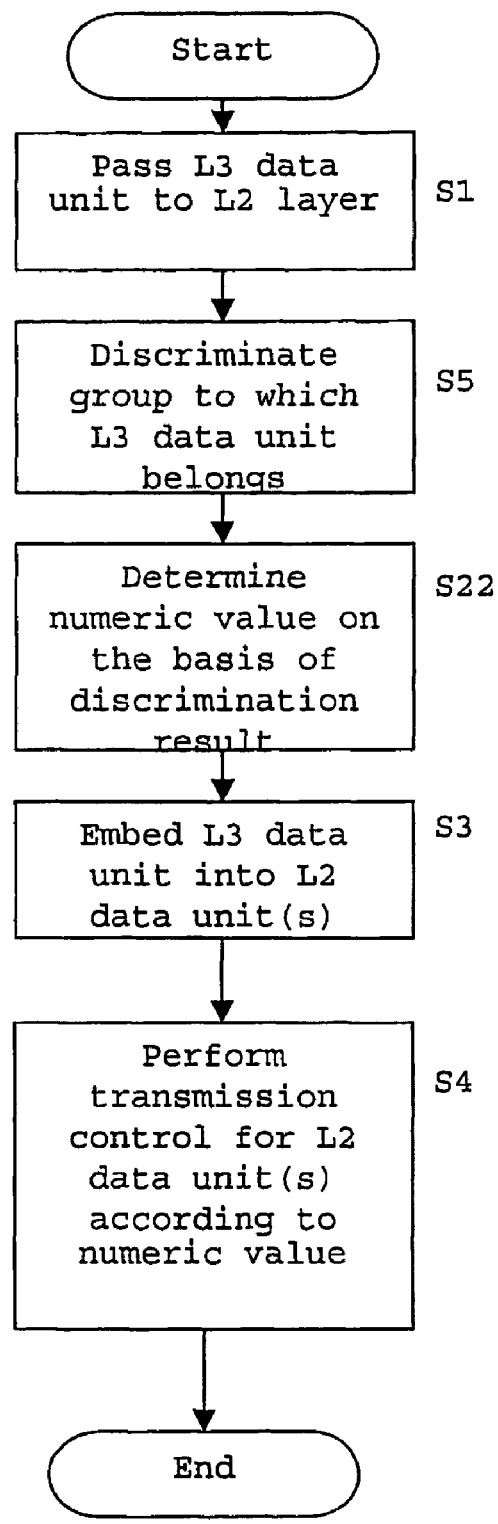
FIG. 4 shows a flow chart for explaining another embodiment of the present invention, in which the numeric value is determined based on the discrimination result.

In FIG. 3, the discrimination result obtained in step S5 is used as an element in the transmission control operation of procedure S40. However, the discrimination of a received L3 data unit into one of a predetermined number of groups can also be used as a basis for determining the numeric value that is then later to be used in the transmission control operation. This is shown in FIG. 4. After having received the L3 data unit in step S1, the discrimination step S5 is performed. Then, in step S22, which is an example of the general step S2 shown in FIG. 1, the numeric value is determined on the basis of the discrimination result. Thereafter steps S3 and S4 are conducted, as already explained in connection with FIG. 1.

For example, the numerically quantifiable parameter can be associated with a buffer fill level of a buffer holding L2 data units, where the numerically quantifiable parameter is the number of L2 data units in the buffer that embed L3 data units belonging to the group discriminated in step S5. The numerically quantifiable parameter can alternatively be the inter-arrival time of L3 data units belonging to the discriminated group. The advantages of determining the numerically quantifiable parameter in this way shall be discussed in more detail with respect to the example shown in FIG. 5.

Figure 5:
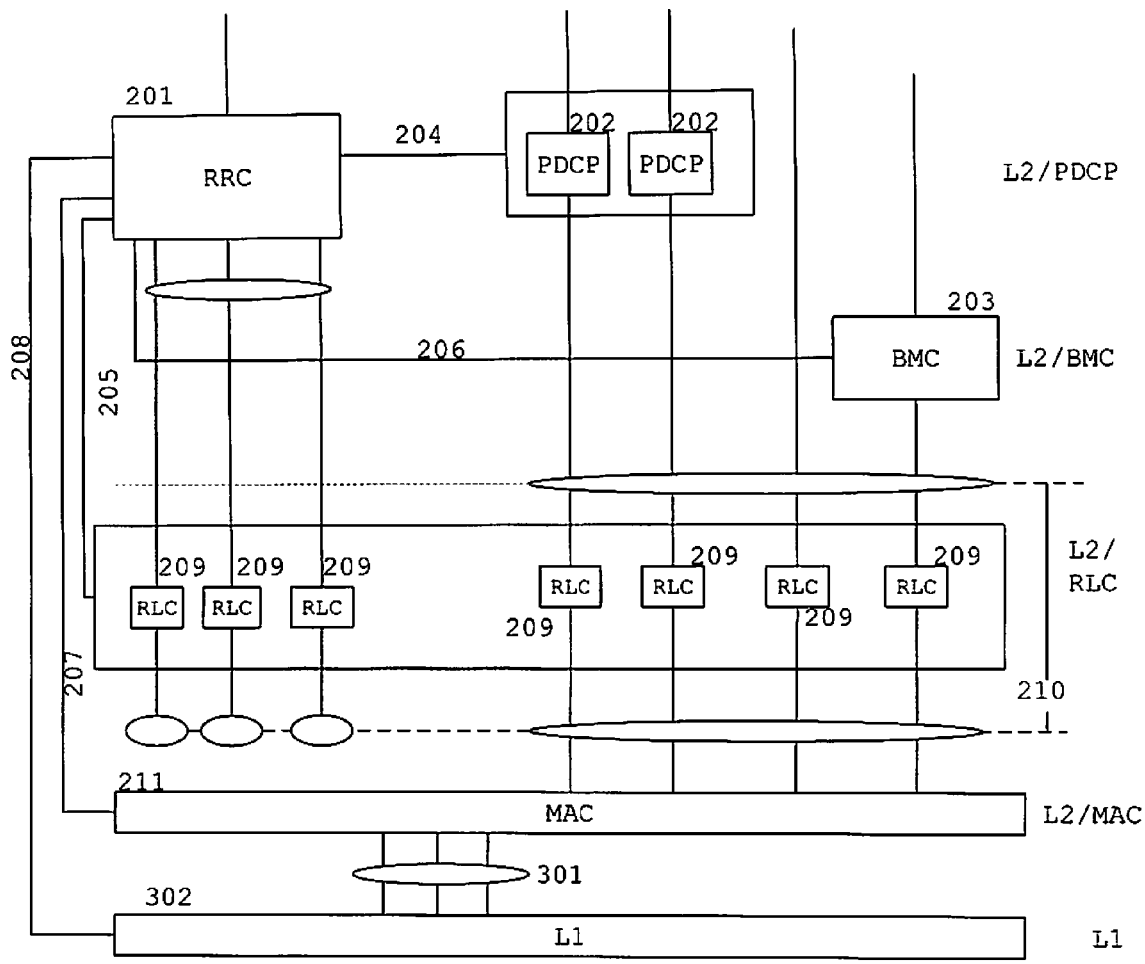
FIG. 5 shows an overview of a protocol structure to which the present invention can be applied.

FIG. 5 shows an embodiment of the present invention implemented in the context of a link layer operating in accordance with the universal mobile telephone system (UMTS) as e.g. described in the Technical Specification 3G TS 25.301 V3.3.0 (1999-12), published by the 3rd Generation Partnership Project (http://www.3gpp.org). This document is herewith fully incorporated by reference into the present disclosure.

It may be noted that FIG. 5 shows a preferred application of the present invention. However, the present invention is by no means restricted thereto. Much rather, the method and system of the present invention can be applied in the context of any mobile communication device, e.g. also one operating in accordance with the general package audio service (GPRS) or any other mobile communication standard. Furthermore, a method and system of the present invention are naturally not restricted to the application in mobile communication systems, but can be applied in any communication system having a protocol hierarchy.

In FIG. 5, a radio resource control (RRC) procedure 201 is provided, which controls the operation of other parts of the general L2 implementation, said L2 protocol implementation consisting of sub-layers L2/PDCP, L2/BMC, L2/RLC and L2/MAC. FIG. 5 schematically shows control connections 204, 205, 206, 207 and 208 to the other procedures, that shall be described in the following. Namely, a one or more packet data convergence protocol (PDCP) procedures 202 are implemented for performing the functions of the packet data convergence protocol. Furthermore, a BMC (Broadcast/Multicast Control) procedure 203 is implemented for performing the function of controlling the sending of data units to a plurality of destinations, via multicasting or broadcasting. Reference numeral 209 refers to radio link control (RLC) procedures that implement the radio link control protocol. 211 identifies the medium access control (MAC) part of the L2 layer. Finally, 302 schematically represents the physical layer L1.

The radio resource control procedure 201 receives control information from the higher layer L3 (not shown). The user-plane passes down L3 data units that are to be embedded into L2 data units, to the PDCP procedure 202, to the BMC procedure 203 and/or a RLC procedure 209.

Reference numeral 210 represents logical channels in the L2 layer, while reference numerals 301 refers to transport channels between L2 and L1.

The general control for the L2 layer implementation is performed by the RRC procedure 201. More specifically, user data is transmitted on a radio access bearer. Via the radio resource control procedure 201, one or more radio bearers are configured, which determine the layer 1 and layer 2 configuration of the radio protocols. In the PDCP procedure 202, IP header compression is applied and a multiplexing of multiple traffic flows onto one logical channel is used. The ELC procedure applies backward error correction, such a ARQ, for a logical channel, among other things. The MAC procedure 211 performs a scheduling of L2 data units and performs the distribution onto the transport channels 301.

Figure 6:
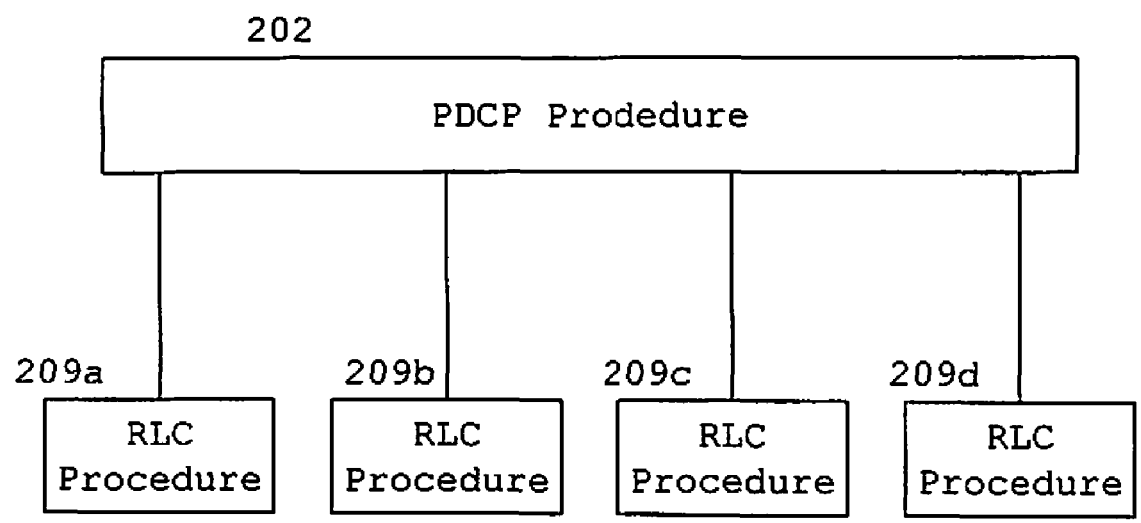
FIG. 6 schematically illustrates the concept of flow-splitting in the context of the example shown in FIG. 5.

As an embodiment of the present invention, the function of the PDCP procedure 202 is extended by a splitting function, which separates the received traffic flow (e.g. an IP flow) into sub-flows, which are then transmitted via separate RLC connections. Since IP header compression is applied in PDCP, the necessary flow information is already available in PDCP. An example, a corresponding flow splitting is schematically depicted in FIG. 6. A flow of IP data units received at the PDCP procedure 202, is split into four sub-flows, each respectively handled by a separate RLC procedure 209a, 209b, 209c and 209d.

The splitting is performed in accordance with the numeric value of the numerically quantifiable parameter, e.g. the L3 data unit size, a buffer fill level, or an inter-arrival time. Additionally, the splitting can also be conducted in dependence on the type of data unit.

For example, the numerical value can be the L3 unit size and the type of data unit being transported. Then the splitting shown in FIG. 6 can be arranged in such a way that data units having the size of an acknowledgment and being TCP data units can be transmitted with an optimum RLC configuration, i.e. minimum delay, and the other IP data units are separated onto RLC connections, which are optimized for the respective data unit size and/or respective data unit type.

An alternative way of splitting the IP flow into a plurality of RLC sub-flows is to separate different phases of the IP flow, e.g. to separate the TCP slow-start phase from the congestion avoidance phase. If the slow-start phase is configured such that a lower transmission delay is achieved, the end-to-end performance will be greatly enhanced and link resources (e.g. codes) are released more quickly.

Methods for reducing the transmission delays are e.g. a higher signal/interference-ratio target, stronger forward error correction, more aggressive ARQ settings etc. To differentiate the different phases of a TCP flow, the above described methods of employing a buffer fill-level as the numerically quantifiable parameter, or using the inter-arrival time can be used. As already mentioned previously, the determination of an inter-arrival time can also be combined with the determination of a data unit size range, in that the value used as a basis for transmission control is the inter-arrival time of data units falling into a predetermined size range.

For example, if the RLC buffer level is used, then it could be concluded that if the RLC buffer fill level is below a predetermined threshold, the TCP flow is probably in the slow-start phase (or at the end of application data), since no new data is arriving. Above this predetermined threshold, or above a second predetermined threshold, it is very likely that TCP is in the congestion avoidance phase. As a consequence, if the buffer fill level indicates a slow-start phase, then the L2 data units are placed into an RLC connection optimized for reducing delay, and if the buffer fill level indicates a congestion avoidance phase, then the L2 data units are placed into a RLC connection optimized for throughput.

Corresponding considerations apply when using the inter-arrival time of the IP data units as a numerically quantifiable parameter. Namely, if the inter-arrival time is above a predetermined threshold, then this may indicate a slow-start phase, whereas if the inter-arrival time is below this same predetermined threshold, or below a second threshold, then this may indicate a congestion avoidance phase.

It may be noted that an alternative to splitting the flow into several RLC sub-flows, as shown in FIG. 6, in which each stream of data units is handled by a separate RLC procedure 209a, 209b, 209c or 209d, is to transmit all data units in one adaptive sub-flow. In this case, all data units are handled by the same RLC procedure, however, each data unit is handled differently (different forward error correction, different segmentation sizes, different ARQ, different transmission power (e.g. different target signal-to-interference ratio), etc.).

In the previous embodiments, a numeric value associated with at least one numerically quantifiable parameter associated with an L3 data unit was used as a parameter for controlling the embedding of the L3 data unit and/or 5 controlling the transmission of L2 data units embedding said L3 data unit. Now, in connection with FIGS. 7 to 10, embodiments will be described, which relate to applying the concept of employing a numerically quantifiable parameter to the performing of a congestion alleviation procedure for 10 buffered L3 data units and/or buffered L2 data units.

In the following examples, the congestion alleviation procedure will be described in terms of a data unit dropping procedure.

FIG. 7a shows a routine for buffering received L3 data units. It may be noted that such received L3 (generally: higher layer) data units received at a given layer (e.g. L2 ) are referred to as service data units (SDUs), whereas the data units into which such an SDU is embedded (encapsulated or segmented) is referred to as a protocol data unit (PDU). As a consequence, the buffer into which such received L3 data units are placed can also be referred to as an SDU buffer. This SDU buffer stores the received L3 data units before they are processed (embedded) into L2 data units. Returning to the routine of FIG. 7a, a first step S1 consists in passing an L3 data unit to the L2 layer, after which one or more numeric values belonging to at least one numerically quantifiable parameter associated with the received L3 data unit are determined in step S2. These steps S1 and S2 are just like the steps of same reference numeral described in connection with FIGS. 1 to 4, and can be embodied as described in detail with respect to these Figures. Therefore, the numerically quantifiable parameter can e.g. be the data unit size or the inter-arrival time of the data units. Finally, the received L3 data unit or SDU is placed into an SDU buffer in step S6, where it can be buffered until further processing of the SDU takes place.

It may be noted that step S2 does not necessarily have to be performed prior to the buffering, and could also be performed subsequently, as will be explained in connection with the embodiment of FIG. 9.

The buffering of received SDUs is especially advantageous in situations where the immediate processing at the receiving layer is not guaranteed or feasible, e.g. if the receiving layer is a link layer for sending data over a wireless link.

FIG. 7b shows a routine for processing buffered SDUs, namely for embedding the SDUs into L2 PDUS. In step S31 an SDU is taken out of the SDU buffer and embedded into one or more L2 PDUs. In step S7 the one or more resulting L2 PDUs are buffered in a PDU buffer. The buffered L2 PDUs can then be transmitted according to anyone of the transmission control procedures S4, S40, S41 to S43 explained in connection with FIGS. 1 to 4. It may be noted that the processing routine of FIG. 7b could also be embodied by directly passing the L2 PDUs from step S31 to a transmission control procedure S4, S40, S41-S43.

Figure 7C:
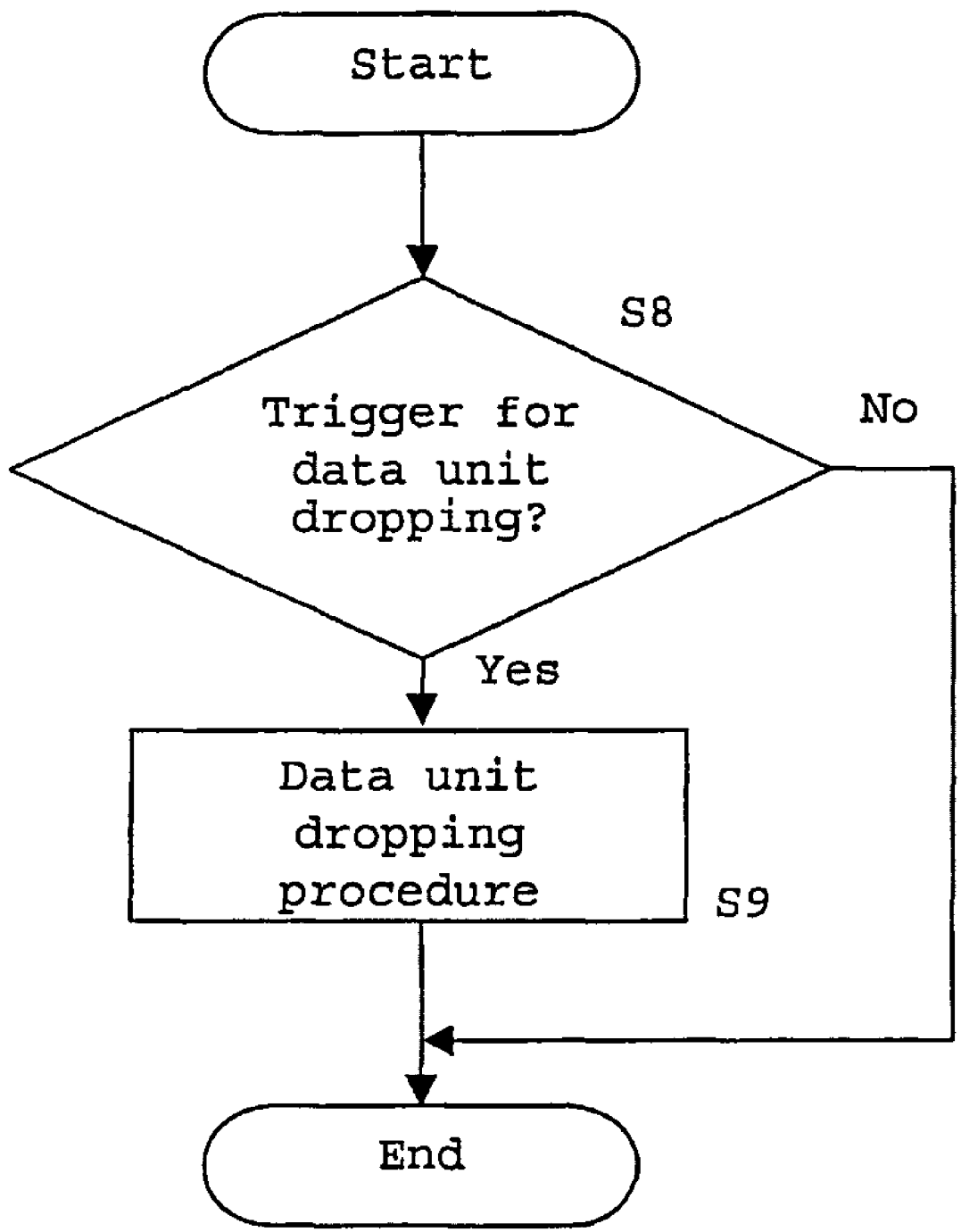

FIG. 7c shows a basic routine for managing the contents of one or both of the SDU buffer and PDU buffer. More specifically, in a step S8 it is determined whether a triggering condition for performing dropping of buffered data units is met or not, and if it is, a data unit dropping procedure S9 is conducted. The triggering conditions can be chosen as is suitable or desirable, e.g. a data unit dropping procedure can be called for if the buffer is an overflow state (e.g. the amount of data in the buffer exceeds an overflow limit), and/or if the link over which the L2 PDUs are to be transmitted is in an overload state (e.g. the bandwidth momentarily provided by the link is lower than a predetermined limit percentage of the bandwidth demanded for sending the data that is to be transmitted over said link).

It may be noted that the dropping of data units is not only useful to relieve an overflow or overload state at the layer where the present embodiments are implemented, but also serves as an indication to higher layers that congestion has occurred. The slow start and congestion avoidance algorithms known from TCP/IP are examples of mechanisms with which flow control can respond to data unit loss along a transmission path.

The data unit dropping procedure S9 comprises a decision step for deciding whether a buffered data unit under consideration is to be dropped or not, where said decision step depends on one or more numeric values that belong to at least one numerically quantifiable parameter associated with a given L3 data unit. The given L3 data unit is the buffered data unit under consideration if this data unit under consideration is an L3 data unit (i.e. if the dropping of an SDU is considered, then the numerically quantifiable parameter is associated with said SDU under consideration, e.g. the size of said SDU or the inter-arrival time associated therewith), and said given L3 data unit is the L3 data unit embedded in said data unit under consideration if the data unit under consideration is an L2 data unit (i.e. if the dropping of an L2 PDU is considered, then the numerically quantifiable parameter is associated with the SDU embedded in the L2 PDU under consideration, e.g. the size of said SDU or the inter-arrival time associated therewith).

As indicated above, the data dropping, procedure can be conducted in one or both of the SDU buffer and the PDU buffer. However, it is preferable to perform any data unit dropping at the highest sub-layer, i.e. at the SDU buffer, in order to avoid unnecessary embedding operations for data that is possibly dropped.

Figure 8:
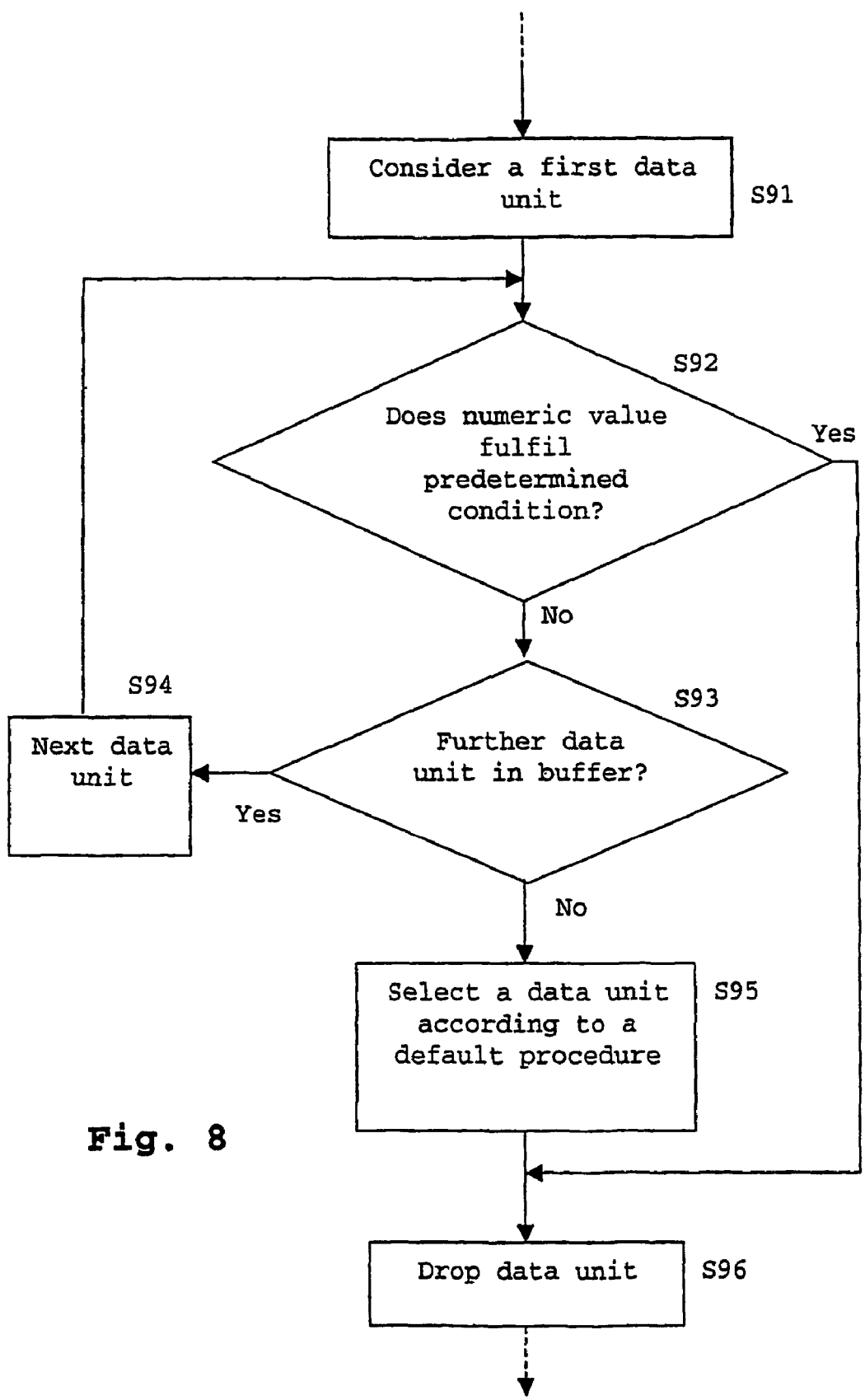
FIG. 8 shows an example of a data unit dropping procedure.

FIG. 8 shows an example of a data unit dropping procedure S9. In a first step S91, a first data unit is considered. The selection of the data unit to be considered can be done as is suitable or desirable, and can depend on the way the data units are buffered. For example, if the data units are queued, then a data unit at a predetermined position in the queue can be selected (such as the first or last data unit), or any other type of selection routine can be chosen, such as the random selection of a data unit.

Then, in step S92, the above mentioned decision step is performed, i.e. it is determined whether the numeric value (e.g. data unit size or inter-arrival time) of the L3 data unit or SDU associated with the data unit under consideration (either the SDU itself or an L2 PDU embedding the SDU) fulfils a predetermined condition or not. If the predetermined condition is fulfilled, the procedure branches to step S96 and drops the data unit under consideration. If not, the procedure branches to step S93, where it is determined whether there are further data units present in the buffer, beyond those already considered. If yes, then the procedure branches to step S94, in which a next data unit is selected, and then the procedure loops back to step S92. The selection of a next data unit to be considered can be performed in any desirable or suitable way and will generally be linked to the method used in step S91. For example, S94 can consist in simply selecting the following or preceding data unit in the queue, or in performing another random selection that only excludes previously selected data units.

If step S93 shows that no more data units are left that have not yet been considered for step S92 (which indicates that none of the data units in the buffer fulfilled the dropping criterion laid out by step S92), then the procedure goes to step S95, in which a default procedure for selecting a data unit is performed, e.g. a data unit at a predetermined position in a queue is selected, or a random selection is performed. Then, the thus selected data unit is dropped in step S96.

The condition checked in step S92 is preferably whether the numeric value (or values) fall above or below a specific threshold. For example, if the numeric value is the size of the L3 data unit or SDU, then it is preferable to drop data units that exceed a certain size. The advantages of doing this will be explained later. If the numeric value is the inter-arrival time, then it is possible to drop data units whose inter-arrival time exceeds a certain time period, or it is possible to drop data units whose inter-arrival time falls short of a certain time period.

In the procedure of FIG. 8, it was assumed that the numeric value is available for checking at S92. This can e.g. be the case by retrieving the value or values determined in step S2 of FIG. 7a. However, it is also possible to include a determination step in the data dropping procedure S9. This is shown in the example of FIG. 9, which relates to the case where the numeric value is the size of the L3 data unit, and the procedure comprises a step S97 for measuring the size, and where the decision step is provided in S920 as a comparison of the measured size with a predetermined threshold Th, where the condition for dropping is met if the measured size exceeds the threshold Th. The remaining steps are the same as in FIG. 8 and will therefore not be described again.

The advantage of dropping data units that exceed a certain size (i.e. not dropping data units that fall below said certain size) is that often the dropping of small data units will impact the data flow at higher layers much more heavily than the dropping of larger data units. Namely, small data units will often not contain payload for a data transmission (i.e. data from yet a higher layer, e.g. an application layer), but rather signaling messages that are important for setting up a connection (such as synchronization messages), for confirming correct transmission (such as acknowledgment messages) or for releasing a connection (such as finish messages). In TCP, examples of such signaling are SYN, ACK and FIN messages. A sender of such signaling messages can often only recover from the loss of such a signaling message by performing a time-out, i.e. waiting until a predetermined time since sending the lost data unit has expired before undertaking any action to remedy the situation. As time-out periods are usually set conservatively (i.e. long), the dropping of such a signaling message can have strong impact on the overall transmission of data units, in contrast to dropping a data unit containing payload. Namely, most protocols for transporting data units are specifically equipped and designed to handle the loss of payload, such that the impact is less severe. As a consequence, overall performance can be enhanced by not dropping small data units, i.e. only dropping data units that exceed a certain size threshold.

As an example, SYN messages are sent at the beginning of a connection set up. If one is lost, the set up will not continue until a time-out has occurred. Consequently, the start of sending payload is strongly delayed. FIN messages are sent at the end of a connection, indicating a closing of the connection. Dropping such a data unit and consequently thereby providing the sender of, that message with an indirect congestion indication, is of no value, as this sender is at the end of the transmission, anyway. In other words, it is much better to drop a data unit from a different source, where the congestion indication will still have an effect.

Dropping ACK messages does not improve the traffic situation as TCP ACKs are cumulative.

It may be added that it is also preferable to drop larger data units in place of smaller ones because the dropping of small data units will generally not improve the buffering delay at the link. In other words, more is done to alleviate the condition that triggered the data unit dropping (e.g. link overload or buffer overflow) if large data units are dropped than if small ones are dropped.

From the above discussion, it can be seen that the setting of the threshold Th is preferably done in dependence on the possible signaling messages sent at higher layers. As an example, if the above embodiment is applied to a layer 2 on top of which TCP is run, then the threshold Th should be set such SYN, ACK and FIN messages are not dropped, i.e. the threshold Th should be set larger or equal to the expected size of the SYN, ACK and FIN messages.

It may be added that the step of discriminating a group into an L3 data unit belongs (e.g. whether it belongs to a specific flow), described above in connection with step S5 in FIGS. 3 and 4, can also be used in connection with data unit dropping procedure. Namely, in addition to making the data unit dropping procedure dependent on the numeric value, the result of such a discrimination step can also be taken into account.

For example, if the discrimination step S5 consists in determining which flow an L3 data unit belongs to, then the decision step S92 or S920 can be amended to also take the discriminated flow into account, e.g. such that no data units from a specific flow or group of flows are dropped, or that only data units from the specific flow or flow group are dropped.

Figure 9:
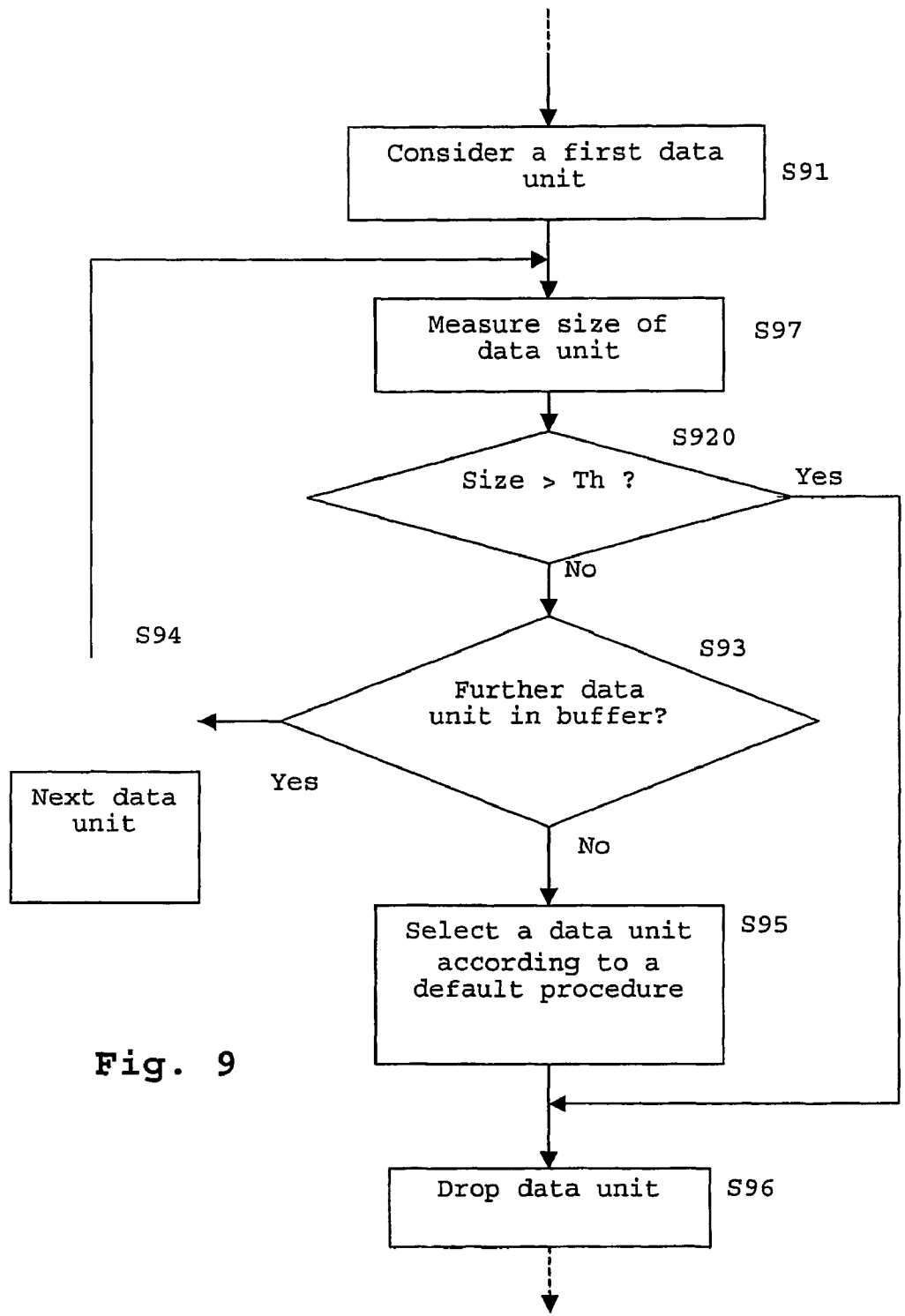
FIG. 9 shows a further example of a data unit dropping procedure.
Figure 10:
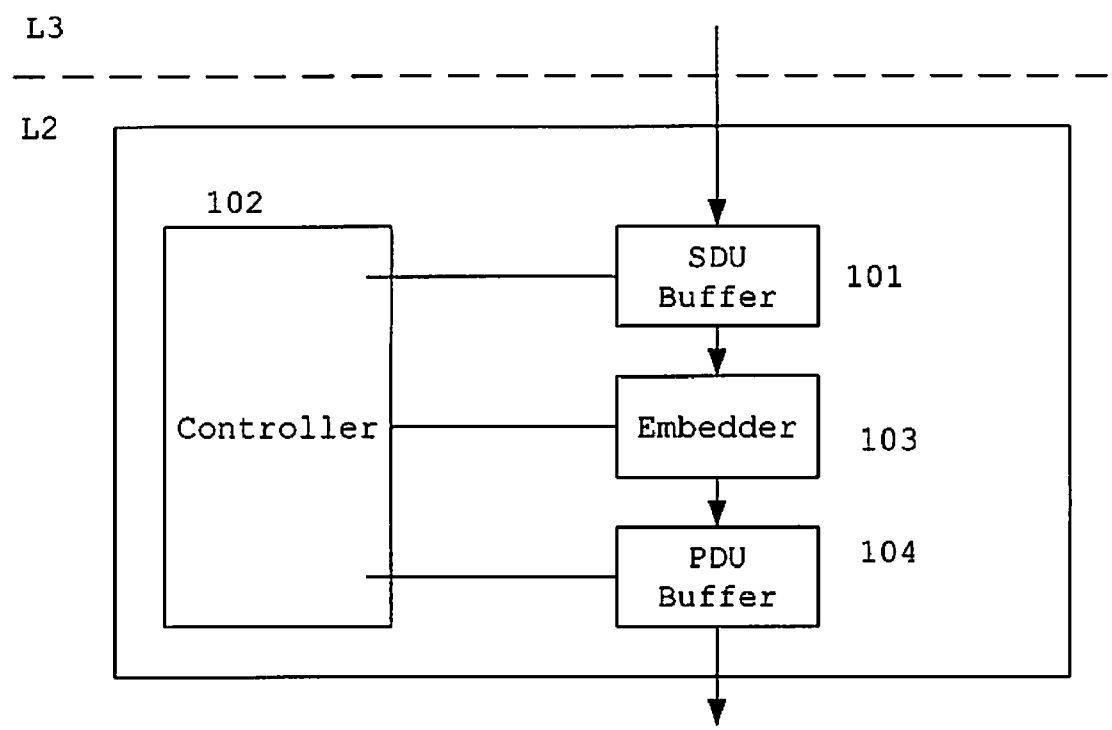
FIG. 10 shows a schematic block diagram of a system that is arranged to perform the routines and procedures of FIGS. 7 to 9.

FIG. 10 shows a schematic representation of a system in which the methods described in connection with FIGS. 7 to 9 can be applied. The L2 implementation comprises an SDU buffer 101, an embedder 103 and a PDU buffer 104, as well as a controller 102 for controlling the operation of each of the entities 101 to 103. The controller 102 is arranged to execute suitable routines, e.g. the routine shown in FIG. 7a for buffering received SDUs in the SDU buffer 101 and the routine shown in FIG. 7b for operating the embedder 103 and PDU buffer 104. The term "implementation" refers to any hardware, software or combination of hardware and software suitable to execute the described routines and provide the desired functionality. As a consequence, the entities 101-104 can also be provided by any suitable hardware, software or combination of hardware and software.

In the above examples of FIGS. 7 to 10, the congestion alleviation procedure was shown as a data unit dropping procedure. Alternatively or additionally, the congestion alleviation procedure can also comprise a data unit marking procedure, in which the congestion alleviation measure does not consist in dropping the data unit, but adding an indicator or notification at a predetermined position (e.g. in a specified header field) in the data unit, where said indicator or notification informs the communication end-points of the data unit that congestion is taking place. An example of such a concept is the Explicit Congestion Notification (ECN) known in the context of TCP/IP, see e.g. RfC 3168.

Data unit marking should preferably be implemented with respect to the SDU buffer, as the SDUs will be marked if the decision step for deciding on the taking of a congestion alleviation measure decides to take a measure.

If a combination of data unit dropping and data unit marking is used a congestion alleviation procedure, then it is preferable that the SDUs be discriminated, e.g. according to protocol identifiers, and SDUs belonging to a predetermined category should be dropped and not marked. In other words, data units for which it does make sense to add a marking, such as User Datagram Protocol (UDP) data units, should not be marked, but rather dropped if it is decided to take a congestion alleviation measure. Namely, as is well known, UDP peers are not responsive to congestion, such that marking with a congestion notification makes no sense. With respect to data units discriminated into a category that is responsive to congestion, such as Transmission Control Protocol (TCP) data units, the congestion alleviation measure can be either dropping or marking, depending on the specific preferences or desires. For example, for congestion responsive SDUs the decision step can be implemented in such a way that data unit marking is performed for a first triggering condition (e.g. a triggering condition indicating that the SDU buffer is in danger of becoming congested, like the exceeding of a first threshold buffer fill level) and data unit dropping is performed for a second triggering condition (e.g. exceeding a second threshold higher than the first threshold, which means that the buffer is congested, such that the buffer load must be reduced).

Although the present invention has been described with reference to specific embodiments these embodiments only serve to provide the skilled person with a full and complete understanding of the invention, but are not intended to limit the scope. The scope of the invention is much rather defined by the appended claims. Reference numerals in the claims are intended to make the claims easier to understand and also do not restrict the scope.

The invention claimed is:

1. A method of processing, in a transmitter, a data unit of a first protocol layer for transmission in a data unit based communication system, comprising the steps of:
    passing to a second protocol layer a given data unit of said first protocol layer that is to be transmitted, said second protocol layer lying below said first protocol layer;
    measuring one or more numeric values, said one or more numeric values belonging to at least one numerically quantifiable parameter associated with said given data unit of said first protocol layer;
    embedding said given data unit of said first protocol layer into one or more data units of said second protocol layer, in an embedding operation;
    adjusting a transmission control procedure for said one or more data units of said second protocol layer that embeds said given data unit of said first protocol layer;
    wherein said embedding operation or said step of adjusting the transmission control procedure is performed in accordance with said one or more numeric values of said at least one numerically quantifiable parameter; and
    transmitting said one or more data units of said second protocol layer according to the adjusted transmission control procedure.

2. The method of claim 1, wherein said at least one numerically quantifiable parameter is the size of said given data unit of said first protocol layer.

3. The method of claim 1, wherein said-at least one numerically quantifiable parameter is associated with a buffer fill level of a buffer holding data units of said first protocol layer or said second protocol layer.

4. The method of claim 1, wherein said at least one numerically quantifiable parameter is an inter-arrival time of data units of said first protocol layer.

5. The method of claim 1, furthermore comprising a step of discriminating a group of data units of said first protocol layer to which said given data unit of said first protocol layer belongs.

6. The method of claim 5, wherein said group is discriminated on the basis of source information, destination information or a protocol identifier contained in said data units of said first protocol layer.

7. The method of claim 5, wherein said transmission control for said one or more data units of said second protocol layer that embed said given data unit of said first protocol layer is also performed in accordance with a result of said discriminating step.

8. The method of claim 5, wherein said numeric value is determined on the basis of a result of said discriminating step.

9. The method of claim 8, wherein said numerically quantifiable parameter is associated with a buffer fill level of a buffer holding data units of said second protocol layer, said numerically quantifiable parameter being the number of data units of said second protocol layer in said buffer that embed data units of said first protocol layer belonging to said group.

10. The method of claim 8, wherein said numerically quantifiable parameter is the inter-arrival time of data units of said first protocol layer belonging to said group.

11. The method of claim 1, wherein said transmission control comprises adjusting a forward error correction for said data units of said second protocol layer or for data units of a third protocol layer below said second protocol layer.

12. The method of claim 11, wherein a function controls the sending of said data units of said second protocol layer over a link, and said transmission control comprises adjusting a transmission power, a data rate over a wireless link or a degree of interleaving.

13. The method of claim 1, wherein said second protocol layer comprises a function of providing automatic retransmission of data units of said second protocol layer under predetermined conditions, and wherein said transmission control comprises adjusting said retransmission function.

14. The method of claim 1, wherein said second protocol layer comprises a function for scheduling of said data units of said second protocol layer, and wherein said transmission control comprises adjusting said scheduling.

15. The method of claim 1, wherein said embedding comprises a segmentation operation for data units of said first protocol layer, and wherein said transmission control comprises adjusting said segmentation operation.

16. The method of claim 15, wherein the adjusting of said segmentation operation comprises adjusting the size of the data units of said second protocol layer into which said given data unit of said first protocol layer is segmented.

17. The method of claim 1, wherein said transmission control comprises discriminating said one or more data units of said second protocol layer in which said given data unit of said first protocol layer is embedded on the basis of said numeric value, and placing each of said one or more data units of said second protocol layer into one of a plurality of predetermined transmission categories on the basis of said discrimination result.

18. A data unit based communication system including implementations of a first protocol layer and a second protocol layer, said first protocol layer lying above said second protocol layer, said system comprising:
    means for passing a given data unit of said first protocol layer that is to be transmitted to said second protocol layer;
    means for determining one or more numeric values belonging to at least one numerically quantifiable parameter associated with said given data unit of said first protocol layer;
    means for embedding said given data unit of said first protocol layer into one or more data units of said second protocol layer in an embedding operation; and
    means for adjusting transmission control procedure for said one or more data units of said second protocol layer wherein said means for embedding and means for adjusting perform in accordance with said one or more numeric values of said at least one numerically quantifiable parameter.

19. The data unit based communication system of claim 18, wherein said at least one numerically quantifiable parameter is the size of said given data unit of said first protocol layer.

20. The data unit based communication system of claim 18, wherein said at least one numerically quantifiable parameter is associated with a buffer fill level of a buffer holding data units of said first protocol layer or said second protocol layer.

21. The data unit based communication system of claim 18, wherein said at least one numerically quantifiable parameter is an inter-arrival time of data units of said first protocol layer.

22. The data unit based communication system of claim 18, further comprising means for discriminating a group of data units of said first protocol layer to which said given data unit of said first protocol layer belongs.

23. The data unit based communication system of claim 22, wherein said means for discriminating said group on the basis of source information, destination information, or a protocol identifier contained in said data units of said first protocol layer.

24. The data unit based communication system of claim 22, wherein said means for performing transmission control for said one or more data units in accordance with a result of said discriminating.

25. The data unit based communication system of claim 22, wherein said means for determining determines a numeric value on the basis of a result of said discriminating step.

26. The data unit based communication system of claim 25, comprising a buffer for holding data units of said second protocol layer, said numerically quantifiable parameter being the number of data units of said second protocol layer in said buffer that embed data units of said first protocol layer belonging to said group.

27. The data unit based communication system of claim 25, comprising a timer for measuring an inter-arrival time of data units of said first protocol layer belonging to said group, wherein said numerically quantifiable parameter is the inter-arrival time of data units of said first protocol layer belonging to said group.

28. The data unit based communication system of claim 18, wherein said transmission control comprises adjusting a forward error correction for said data units of said second protocol layer or for data units of a third protocol layer below said second protocol layer.

29. The data unit based communication system of claim 28, further comprising a function for controlling the sending of said data units of said second protocol layer over a link, and said transmission control comprises adjusting a transmission power, a data rate over said link, or a degree of interleaving.

30. The data unit based communication system of claim 18, wherein said implementation of said second protocol layer comprises a function of providing automatic retransmission of data units of said second protocol layer under predetermined conditions, and wherein said transmission control comprises adjusting said retransmission function.

31. The data unit based communication system of claim 18, wherein said implementation of said second protocol layer comprises a function for scheduling of said data units of said second protocol layer, and wherein said transmission control comprises adjusting said scheduling.

32. The data unit based communication system of claim 18, wherein said implementation of said second protocol layer is arranged to perform a segmentation operation for data units of said first protocol layer, and wherein said transmission control comprises adjusting said segmentation operation.

33. The data unit based communication system of claim 32, wherein the adjusting of said segmentation operation comprises adjusting the size of the data units of said second protocol layer into which said given data unit of said first protocol layer is segmented.

34. The data unit based communication system of claim 18, wherein said transmission control comprises discriminating said one or more data units of said second protocol layer in which said given data unit of said first protocol layer is embedded on the basis of said numeric value, and placing each of said one or more data units of said second protocol layer into one of a plurality of predetermined transmission categories on the basis of said discrimination result.

35. The method of claim 1 further comprising the steps of:
performing, in a transmitter, a buffering operation for one or both of
  said data unit of said first protocol layer and
  one or more data units of said first protocol layer into which said data unit of said second protocol layer is initially embedded,
performing, in the transmitter, a congestion alleviation procedure for buffered data units if one or more predetermined triggering conditions are fulfilled, said congestion alleviation procedure comprising:
  deciding whether congestion alleviation measure is to be performed with respect to a buffered data unit under consideration, said decision step depending on the determined one or more numeric values, said given data unit of said first protocol layer being the data unit under consideration if the data unit under consideration is a data unit of the first protocol layer, and said given data unit of said first protocol layer being a data unit of said first protocol layer embedded in said data unit under consideration if the data unit under consideration is a data unit of said second protocol layer.

36. The method of claim 1, wherein the step of embedding or the step of adjusting transmission control is performed in the transmitter in accordance with the one or more numeric values of the at least one numerically quantifiable parameter between a first mode, optimizing data throughput and a second mode, optimizing data.

* * * * *

UNITED STATES PATENT AND TRADEMARK OFFICE
CERTIFICATE OF CORRECTION

| | | |
|---|---|---|
| PATENT NO. | : 7,876,781 B2 | Page 1 of 2 |
| APPLICATION NO. | : 10/480953 | |
| DATED | : January 25, 2011 | |
| INVENTOR(S) | : Meyer et al. | |

It is certified that error appears in the above-identified patent and that said Letters Patent is hereby corrected as shown below:

On the Face Page, in Field (56), under "OTHER PUBLICATIONS", in Column 2, Line 2, delete "IAEEE/ACM" and insert -- IAEEE/AMC --, therefor.

On Page 2, in Field (56), under "OTHER PUBLICATIONS", in Column 2, Line 2, delete "RSN;" and insert -- RAN; --, therefor.

In Fig. 9, Sheet 10 of 11, delete " " and insert -- --, therefor.

In Column 2, Line 61, delete "this," and insert -- this --, therefor.

In Column 5, Line 16, delete "units of," and insert -- units of --, therefor.

In Column 5, Line 18, delete "belonging" and insert -- belonging to --, therefor.

In Column 7, Line 28, delete "an-example," and insert -- an example, --, therefor.

In Column 7, Line 66, delete "transmission,." and insert -- transmission --, therefor.

In Column 8, Line 33, delete "(steps" and insert -- (step --, therefor.

In Column 12, Line 42, delete "ELC" and insert -- RLC --, therefor.

In Column 12, Line 55, delete "202," and insert -- 202 --, therefor.

Signed and Sealed this
Sixth Day of December, 2011

David J. Kappos
*Director of the United States Patent and Trademark Office*

CERTIFICATE OF CORRECTION (continued)
U.S. Pat. No. 7,876,781 B2

In Column 13, Line 53, after "and/or" delete "5".

In Column 13, Line 58, after "for" delete "10".

In Column 14, Line 27, delete "PDUS." and insert -- PDUs. --, therefor.

In Column 15, Line 10, delete "dropping," and insert -- dropping --, therefor.

In Column 16, Line 40, delete "of," and insert -- of --, therefor.

In Column 16, Line 42, delete "transmission," and insert -- transmission --, therefor.